United States Patent
Zhao et al.

(10) Patent No.: US 10,914,410 B2
(45) Date of Patent: Feb. 9, 2021

(54) NON-METALLIC CABLING CONTINUOUS OIL PIPE

(71) Applicant: Weihai Hongtong Piping Materials Co., Ltd., Shandong (CN)

(72) Inventors: Jianqiang Zhao, Shandong (CN); Hongzheng Lian, Shandong (CN); Zhaojun Lv, Shandong (CN); Tingting Bi, Shandong (CN); Dongdong Qu, Shandong (CN); Jiajia Wang, Shandong (CN)

(73) Assignee: Weihai Hongtong Piping Materials Co., Ltd., Shandong (CN)

(*) Notice: Subject to any disclaimer, the term of this patent is extended or adjusted under 35 U.S.C. 154(b) by 203 days.

(21) Appl. No.: 16/098,451

(22) PCT Filed: May 24, 2018

(86) PCT No.: PCT/CN2018/088252
§ 371 (c)(1),
(2) Date: Nov. 2, 2018

(87) PCT Pub. No.: WO2019/196168
PCT Pub. Date: Oct. 17, 2019

(65) Prior Publication Data
US 2020/0240554 A1    Jul. 30, 2020

(30) Foreign Application Priority Data
Apr. 11, 2018  (CN) .......................... 2018 1 0323257

(51) Int. Cl.
*E21B 17/00* (2006.01)
*F16L 11/12* (2006.01)
*F16L 9/12* (2006.01)
*F16L 9/16* (2006.01)
*F16L 11/08* (2006.01)
*F16L 11/127* (2006.01)

(52) U.S. Cl.
CPC ............ *F16L 11/12* (2013.01); *E21B 17/003* (2013.01); *F16L 9/12* (2013.01); *F16L 9/16* (2013.01); *F16L 11/083* (2013.01); *F16L 11/127* (2013.01)

(58) Field of Classification Search
CPC ....................................................... F16L 11/12
USPC ....................................................... 166/242.1
See application file for complete search history.

(56) References Cited

FOREIGN PATENT DOCUMENTS

CN     207194843 U  *  4/2018

* cited by examiner

*Primary Examiner* — Taras P Bemko
(74) *Attorney, Agent, or Firm* — Berggren LLP

(57) ABSTRACT

A non-metallic cabling continuous oil pipe, relating to the technical field of oil mining in oil fields, is disclosed. Said oil pipe includes an inner liner tube, the inner liner tube which is used to form a passageway for medium transportation. An outer wall of the inner liner tube is provided with a cable embedded layer and a protection sleeve in sequence, the cable embedded layer including cables and a plurality of reinforcement belts. The reinforcement belts are used to resist torsional deformation and to bear an axial tension. The protection sleeve is used to prevent the cables from being worn.

17 Claims, 2 Drawing Sheets

NON-METALLIC CABLING CONTINUOUS OIL PIPE

PRIORITY

This application is a U.S national application of the international application number PCT/CN2018/088252 filed on 24 May 2018, which claims priority of Chinese application CN 2018103232579 filed on Apr. 11, 2018, the contents of all of which are incorporated herein by reference.

TECHNICAL FIELD

The present disclosure relates to the technical field of oil mining in oil fields, particularly to a non-metallic cabling continuous oil pipe.

BACKGROUND ART

The petroleum is, as a part of national economy, an important energy source, and compared with coal, it has advantages such as high energy density (equal weight of petroleum combustion heat is higher than standard coal by 50%), convenient transportation and storage, and less pollution to atmosphere after combustion. Fuel oil refined from the petroleum is a main fuel of transportation means, power station boilers, and various furnaces in the metallurgical industry and the construction material industry. Liquefied gas and piped gas using petroleum as a raw material are quality fuels used in life of urban residents. Airplanes, tanks, naval vessels, rockets and other spacecrafts also consume a lot of petroleum fuel. Therefore, many countries have listed the petroleum as a strategic material.

In a conventional petroleum mining process, in most cases, cables are outlaid separately outside oil pipes for supplying power to downhole tools or transmitting signals for downhole equipment, and the cables need to be armored separately, thus the cost is high. Moreover, in mining operations, the cables need a separate fixing manner, thus operation efficiency is low and the cables are very likely to be damaged. Since an inner space of a wellhole is narrow, when the cables are outlaid and protrude for an underground operation, the cables are easily worn, such situation is especially prominent in directional wells, and it always happens that the cables have already been damaged after the underground operation and cannot be used any more.

SUMMARY

Objects of the present disclosure include providing a non-metallic cabling continuous oil pipe, so as to relieve the inconvenience that the cables need to be armored separately in the petroleum mining system of prior art, and prolong the service life of the cables.

In a first aspect, an embodiment of the present disclosure provides a non-metallic cabling continuous oil pipe, including: an inner liner tube, the inner liner tube being used to form a passageway for medium transportation;

from inside to outside, an outer wall of the inner liner tube being provided with a cable embedded layer and a protection sleeve in sequence thereon, the cable embedded layer including cables and a plurality of reinforcement belts, the reinforcement belts being used to resist torsional deformation and to bear an axial tension; and the protection sleeve being used to prevent the cables from being worn.

Furthermore, from inside to outside, there is a plurality of the cable embedded layers.

Furthermore, a material of the reinforcement belts includes fiber and resin.

Furthermore, U-shape wear resistant belts are provided outside the reinforcement belts, and the U-shape wear resistant belts are used to isolate adjacent reinforcement belts.

Furthermore, an outer wall of the inner liner tuber is provided with spiral grooves cooperating with the U-shape wear resistant belts.

Furthermore, in the cable embedded layer, at least two reinforcement belts are spirally wound and arranged axially, around the inner liner tube.

Furthermore, there is a demising clearance between at least two adjacent reinforcement belts, and the demising clearance is used to accommodate the cables, such that the cables are spirally wound axially around the inner liner tube.

The demising clearance refers to the gap between adjacent U-shape wear resistance belts.

Furthermore, the cables are embedded in the reinforcement belts.

Furthermore, the number of the cable embedded layer is two, being an inner layer and an outer layer respectively, the inner layer is provided outside the inner liner tube, and the outer layer is provided outside the inner layer.

Furthermore, a cable in the inner layer is a signal cable, and the signal cable is embedded in the reinforcement belt in the inner layer; and a cable in the outer layer is a power cable, and there is a demising clearance between at least two adjacent reinforcement belts in the outer layer, and the demising clearance is used to accommodate the power cable, such that the power cable is spirally wound axially, around the inner liner tube.

Furthermore, a horizontal cross section of the power cable is in an oval shape, and a horizontal cross section of the signal cable is in a circular shape.

Furthermore, the spiral directions of the reinforcement belt in the inner layer and the reinforcement belt in the outer layer are opposite.

Furthermore, the power cable and the signal cable are staggered in a radial direction, for reducing interference between each other of the power cable and the signal cable.

Furthermore, a circumferential reinforcement layer is provided between the inner liner tube and the cable embedded layer; and the circumferential reinforcement layer includes a first fiber bundle and a second fiber bundle, the first fiber bundle and the second fiber bundle are cross-wound and fixed on the inner liner tube in different spiral directions.

Furthermore, a skeleton layer is provided between the circumferential reinforcement layer and the cable embedded layer; and the skeleton layer includes a plurality of fiber belts wound on the circumferential reinforcement layer.

The skeleton layer portion is a force base of the entire pipe and can bear the radial force of the pipe.

Furthermore, polyvinyl chloride (PVC) separation films are provided between a plurality of the fiber belts.

Furthermore, the inner liner tube and the circumferential reinforcement layer, the circumferential reinforcement layer and the skeleton layer, the skeleton layer and the cable embedded layer, and the cable embedded layer and the protection sleeve are sliding-sleeved therebetween respectively, such that any two adjacent structures of the inner liner tube, the circumferential reinforcement layer, the skeleton layer, the cable embedded layer and the protection sleeve are not bonded to each other.

Furthermore, fibers in the reinforcement belts, the circumferential reinforcement layer and the skeleton layer are formed by means of wet winding.

Furthermore, a material of the protection sleeve includes a high polymer material.

A non-metallic cabling continuous oil pipe includes an inner liner tube, a cable embedded layer and a protection sleeve connected in sequence from inside to outside, wherein the cable embedded layer includes cables and a plurality of reinforcement belts, a plurality of the reinforcement belts are spirally wound onto an outer wall of the inner liner tube, and the cables are provided in the reinforcement belts or among a plurality of the reinforcement belts.

Beneficial effects brought about by the embodiments of the present disclosure include the following.

The non-metallic cabling continuous oil pipe provided in the embodiments of the present disclosure includes the inner liner tube, the inner liner tube being used to form a passageway for medium transportation, for transporting crude oil. From inside to outside, the outer wall of the inner liner tube is provided with the cable embedded layer and the protection sleeve in sequence, the cable embedded layer includes cables and a plurality of reinforcement belts, the reinforcement belts are used to resist torsional deformation and to bear an axial tension; and the protection sleeve is used to prevent the cables from being worn. The non-metallic cabling continuous oil pipe provided in the embodiments of the present disclosure is embedded with the cables, instead of outlaying the cables in the conventional modes, which overcomes drawbacks of time-consuming and effort-consuming operation with a high cost, and easy damage to the cables due to separate armoring of outlaid independent cables required by a conventional steel-made oil pipe, reduces a wearing rate of the cables to a great extent, prolongs the service life of the cables, improves oil mining efficiency, and reduces an oil mining cost.

Other features and advantages of the present disclosure will be illustrated in the following description, and partially become apparent from the description or are understood by implementing the present disclosure. The object and other advantages of the present disclosure are achieved and obtained through structures particularly indicated in the description, the claims, and the drawings.

In order to make it more obvious and easier to understand the above object, features and advantages of the present disclosure, preferred embodiments are particularly illustrated in the following to make detailed description below in conjunction with the accompanying drawings.

BRIEF DESCRIPTION OF DRAWINGS

In order to more clearly illustrate technical solutions of embodiments of the present disclosure or the prior art, figures which are needed to be used in the description of the embodiments or the prior art will be introduced briefly below. Obviously, the figures in the following description are for some embodiments of the present disclosure. A person ordinarily skilled in the art could still obtain other figures according to these figures, without paying inventive efforts.

Reference signs: 100—inner liner tube; 200—cable embedded layer; 210—reinforcement belt; 220—signal cable; 230—power cable; 300—protection sleeve; 400—circumferential reinforcement layer; 500—skeleton layer; 250—U—shape wear resistant belt; 260—spiral groove.

DETAILED DESCRIPTION OF EMBODIMENTS

The technical solutions of the present disclosure will be described clearly and completely below in conjunction with figures. Apparently, the described embodiments are some but not all of embodiments of the present disclosure. All the other embodiments obtained by a person ordinarily skilled in the art without paying inventive effort, based on the embodiments of the present disclosure, shall fall within the scope of protection of the present disclosure.

In the description of the present disclosure, it should be noted that orientational or positional relationships indicated by terms such as "center", "upper", "lower", "left", "right", "vertical", "horizontal", "inner" and "outer" are based on orientational or positional relationships as shown in the figures, and are merely for facilitating the description of the present disclosure and simplification of the description, rather than indicating or implying that related devices or elements have to be in the specific orientation or configured and operated in the specific orientation, and therefore, should not be construed as limiting the present disclosure. Besides, terms such as "first", "second" and "third" are merely for descriptive purpose, and should not be construed as indicating or implying relative importance.

Furthermore, in the description of the present disclosure, unless otherwise specified and defined, terms "join" and "connect" should be construed in a broad sense. For example, it may be a fixed connection, a detachable connection, or an integrated connection; it may be a mechanical connection or an electrical connection; it may be a direct connection or an indirect connection through an intermediate medium; it may also be an inner communication between two elements. For a person ordinarily skilled in the art, specific meanings of the above-mentioned terms in the present disclosure can be understood according to specific circumstances.

First Embodiment

Figure 1:
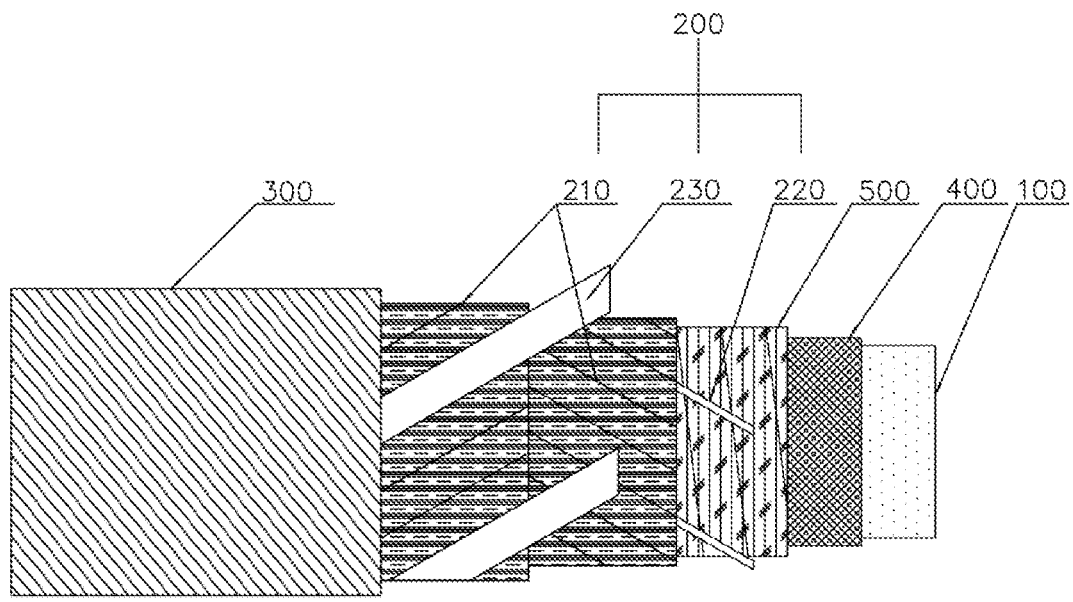
FIG. 1 is a schematic diagram of a non-metallic cabling continuous oil pipe provided in a first embodiment of the present disclosure.
Figure 2:
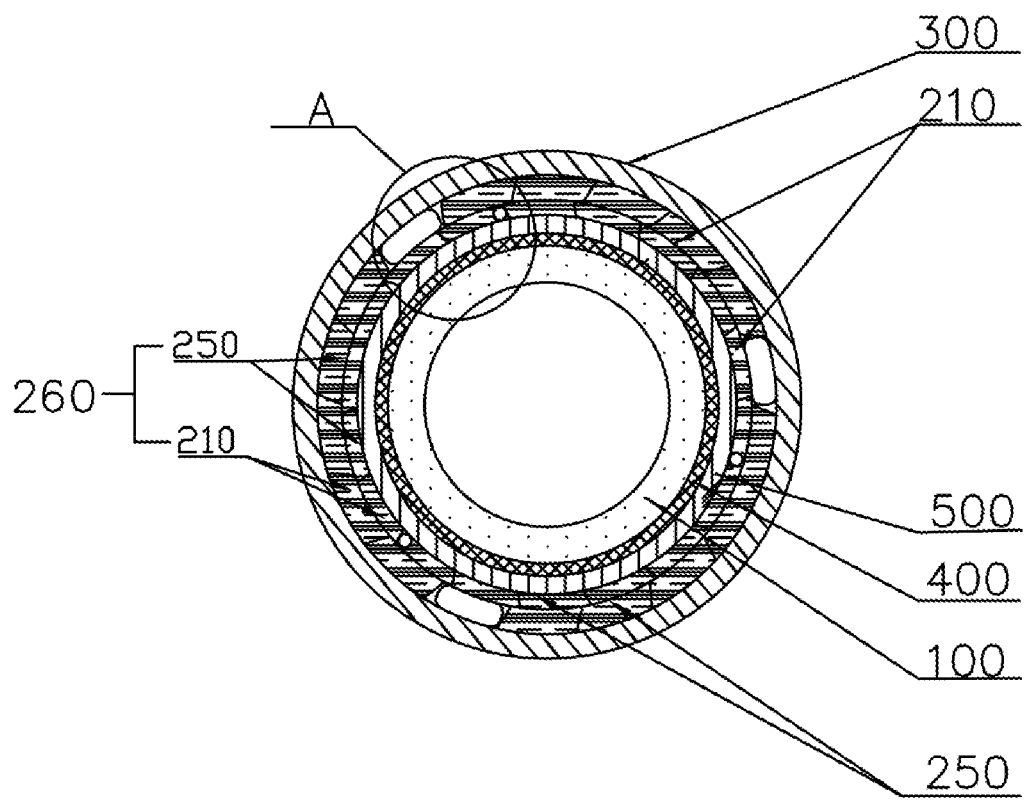
FIG. 2 is a cross-section diagram of the non-metallic cabling continuous oil pipe provided in the first embodiment of the present disclosure.

As shown in FIG. 1 and FIG. 2, a non-metallic cabling continuous oil pipe provided in an embodiment of the present disclosure includes: an inner liner tube 100, wherein the inner liner tube 100 is used to form a passageway for medium transportation, for transporting crude oil. From inside to outside, an outer wall of the inner liner tube 100 is provided with a cable embedded layer 200 and a protection sleeve 300 in sequence, the cable embedded layer 200 includes cables and a plurality of reinforcement belts 210, and the reinforcement belts 200 are used to resist torsional deformation and to bear an axial tension; and the protection sleeve 300 is used to prevent the cables from being worn. The non-metallic cabling continuous oil pipe provided in the embodiment of the present disclosure is embedded with the cables, instead of outlaying the cables in the conventional modes, which overcomes drawbacks of time-consuming and effort-consuming operation with a high cost, and easy damage to the cables due to separate armoring of outlaid independent cables required by a conventional steel-made oil pipe, reduces a wearing rate of the cables to a great extent, prolongs the service life of the cables, improves oil mining efficiency, and reduces an oil mining cost.

As an operation environment of the non-metallic cabling continuous oil pipe is special, the protection sleeve should have wear resistant and corrosion resistant performances. In the present embodiment, a material of the protection sleeve 300 can be a high polymer material. The high polymer material has excellent wear resistant and corrosion resistant performances. In other embodiments, the protection sleeve can be of other wear resistant and corrosion resistant materials.

According to type and number of the cables needed, the number of the cable embedded layer 200 can be plurality. For example, the cables embedded in each cable embedded layer 200 can be of the same type, and according to different types, a plurality of the cable embedded layers 200 are provided from inside to outside, which are processed layer by layer without affecting each other.

Specifically, a material of the reinforcement belts 210 includes fiber and resin. Specifically, in practical processing, the reinforcement belts 210 are made by mixing and infiltrating fiber and resin according to a certain proportion, which then are wound on a position outside the inner liner tube 100, and then are solidified. In the above, "position" refers to a spiral groove 260 outside the inner liner tube 100, for forming a solidified form of the reinforcement belt 210, after the reinforcement belts 210 are solidified, the spiral grooves 260 cooperate with U-shape wear resistant belts 250, and the U-shape wear resistant belts 250 are used to isolate adjacent reinforcement belts 210, and to facilitate the forming of the reinforcement belts 210. A width range of the reinforcement belt 210 is 8-15 mm. In the present embodiment, the reinforcement belts have a width of 12 mm. In other embodiments, the reinforcement belts also can have a width of 10 mm, 14 mm and so on.

It also should be explained that layers of a plurality of the cable embedded layers 200, and the reinforcement belts 210 are not bonded, respectively, and can glide regarding to each other, the layers and the belts can glide regarding to each other, the cooperation between the spiral grooves 260 and the U-shape wear resistant belts 250 prevent the inner liner tube 100 from wearing the reinforcement belts 210 during gliding.

In each cable embedded layer 200, a plurality of the reinforcement belts 210 are spirally wound and arranged axially, around the inner liner tube 100. Such spiral winding manner greatly improves a tensile strength of the non-metallic cabling continuous oil pipe.

Figure 3:
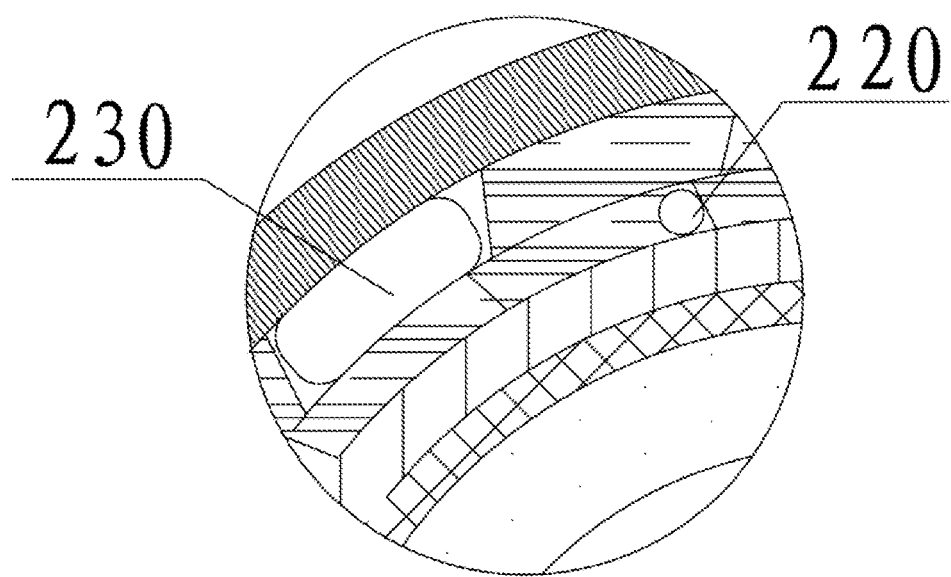
FIG. 3 is a partial enlarged diagram of a place A in FIG. 2.

As shown in FIG. 3, the cables can be provided between a plurality of reinforcement belts or in a single reinforcement belt as required. In one embodiment, there is a demising clearance between at least two adjacent reinforcement belts 210, and the demising clearance is used to accommodate the cables, such that the cables are spirally wound axially around the inner liner tube 100. For the winding of the cables, the cables are wound onto the inner liner tube 100 in a manner of replacing the position of the original fiber reinforcement belt 210, thus the cables are well fixed. In another embodiment, the cables also can be directly embedded in the reinforcement belts 210.

The non-metallic cabling continuous oil pipe provided in the embodiments of the present disclosure can have the above two embodiments, and different fixing manners can be used according to thicknesses of the cables that need to be fixed. Specifically, when the cables are relatively thick, the cables can be fixed in a demising manner, that is, two reinforcement belts 210 clamp and fix one cable; and when the cables are relatively thin, the cables can be directly manufactured into the reinforcement belts 210 in manufacturing. Thus, the protection effect for the cables is better.

Specially, the number of the cable embedded layer 200 provided in an embodiment of the present disclosure can be two, i.e. an inner layer and an outer layer respectively, the inner layer is provided outside the inner liner tube 100, and the outer layer is provided outside the inner layer. The cable in the inner layer is a signal cable 220, and because the signal cable 220 is relatively thin, the signal cable 220 is embedded in the reinforcement belt 210 in the inner layer. The cable in the outer layer is a power cable 230, and because the power cable 230 is relatively thick, there is a demising clearance between at least two adjacent reinforcement belts 210 in the outer layer, and the demising clearance is used to accommodate the power cable 230, such that the power cable 230 is spirally wound axially around the inner liner tube 100.

Since positions of the power cable 230 and of the signal cable 220 are different, different winding processes are used for the power cable 230 and the signal cable 220, for the winding of the power cable 230, the power cable 230 is wound onto the inner liner tube 100 in a manner of replacing the place of the original reinforcement belt 210, thus the power cable 230 is well fixed. For the winding of the signal cable 220, the signal cable 220 is enveloped in the fiber and is wound together with the reinforcement belt 210 onto a pipe body, then the signal cable 220 is fixed and protected by the reinforcement belt 210, and is prevented from being worn.

Specifically, a horizontal cross section of the power cable 230 is in an oval shape, and a horizontal cross section of the signal cable 220 is in a circular shape, since there are a sintered layer and a sheathing layer outside a cable core of the cable, the oval shape and the circular shape can ensure uniform sintering of the outer layer to the sintered layer, thus guaranteeing sintering quality, and improving operational performances of the cables.

The inner liner tube 100 can be a non-metallic pipe or a metallic pipe as required. In the present embodiment, the inner liner tube 100 is a non-metallic pipe, apart from the power cable 230 and the signal cable 220, the non-metallic cabling continuous oil pipe also can be laid with other cables or optical fibers, etc., leading to a broad application range. In other embodiments, the inner liner tube 100 also can be a metallic pipe.

The spiral directions of the reinforcement belt 210 in the inner layer and the reinforcement belt 210 in the outer layer are opposite. The opposite spiral directions can resist the torsional deformation.

The power cable 230 and the signal cable 220 are staggered in a radial direction, for reducing interference between each other of the power cable 230 and the signal cable 220. The power cable 230 and the signal cable 220 are respectively embedded in the two inner and outer cable embedded layers 200, in a spiral crossing distribution, thus the power cable 230 is prevented from interfering the signal cable 220 when the two cables are embedded in the same layer and arranged in parallel.

It should be explained that in other embodiments, the number of the cable embedded layer 200 can be three or four, and the spiral directions of the reinforcement belts in any two adjacent cable embedded layers 200 are opposite; the horizontal cross sections of the power cable 230 and the signal cable 220 also can be in other shapes, for example, both a circular shape or a square shape.

A non-metallic cabling continuous oil pipe provided in an embodiment of the present disclosure includes an inner liner tube 100, a protection sleeve 300 and a cable embedded layer 200, the cable embedded layer 200 includes a reinforcement belt 210, a power cable 230, and a signal cable 220, wherein the cable embedded layer 200 is separated into two layers, i.e. a left-hand layer and a right-hand layer, and the cable embedded layer 200 is embedded with the power cable 230 and the signal cable 220, the power cable 230 is used to transmit power for electrical apparatus of an oil well, and the signal cable 220 provides a passageway for signal transmission of downhole equipment, the power cable 230 and the signal cable 220 are respectively embedded into the two left and right cable embedded layers 200 in a spiral crossing distribution. The protection sleeve 300 is of a high polymer material.

The left-hand layer and the right-hand layer are layers formed of the reinforcement belts 210, wherein the layer formed by making the reinforcement belts 210 rotate in a right direction is the right-hand layer, and the layer form by making the reinforcement belts 210 rotate in a left direction is the left-hand layer. The left-hand layer and the right-hand layer each bear axial tension by achieving balance of the left torsion and right torsion.

Specifically, the power cable 230 is located on the cable embedded layer 200 (left-hand), and has a same width as that of the fiber reinforcement belt 210, and is uniformly wound on the cable embedded layer 200, the signal cable 220 is located on the cable embedded layer 200 (right-hand), and is located in a middle position of the reinforcement belt 210 in the cable embedded layer 200.

For the non-metallic cabling continuous oil pipe provided in the embodiments of the present disclosure, various cables are embedded in the cable embedded layer 200 in different forms, which not only protects the cables against wearing such that the cables have the same service life as the inner liner tube 100, but also meanwhile improves the tensile strength of the inner liner tube 100.

Optionally, a circumferential reinforcement layer 400 is provided between the inner liner tube 100 and the cable embedded layer 200; the circumferential reinforcement layer 400 includes a first fiber bundle and a second fiber bundle, the first fiber bundle and the second fiber bundle are cross-wound and fixed on the inner liner tube 100 in different spiral directions. Specifically, in manufacturing, after being impregnated, the fiber bundles are directly wound on a position under the control of a tension, the first fiber bundle and the second fiber bundle are respectively cross-wound spirally along a left-hand direction and a right-hand direction, and finally solidified and formed. A cross-wound structural form can effectively improve the mechanical performances of the circumferential reinforcement layer, and thus improve the torsion resistant performances of the entire continuous oil pipe.

A skeleton layer 500 is provided between the circumferential reinforcement layer 400 and the cable embedded layer 200, so as to further improve the torsion resistant performances of the entire continuous oil pipe. The skeleton layer 500 includes a plurality of fiber belts wound on the circumferential reinforcement layer 400. Specifically, in manufacturing, after being impregnated, two fiber belts can be simultaneously wound on positions of the inner liner tube 100 at a big angle. At the same time, there can be an L-shape PVC separation thin film between the fiber belts, so as to ensure that the fiber belts are not bonded with each other after being solidified, and meanwhile serve a function of preventing wearing among a plurality of fiber belts.

The inner liner tube 100 and the circumferential reinforcement layer 400, the circumferential reinforcement layer 400 and the skeleton layer 500, the skeleton layer 500 and the cable embedded layer 200, and the cable embedded layer 200 and the protection sleeve 300 are sliding-sleeved respectively. That is, the layers in the non-metallic cabling continuous oil pipe are not bonded with each other, but can slide regarding to each other, which can be achieved by wear resistant belts enveloped outside. Curving of the pipe material is realized as the layers of the non-metallic cabling continuous oil pipe can slide regarding to each other, while the curving is not realized through elastic deformation of the material, thus the strength of the pipe material is improved, and the stretch ratio is low.

Fibers in the reinforcement belts 210, the circumferential reinforcement layer 400 and the skeleton layer 500 are formed in a manner of wet winding. The wet winding has the following advantages: a. a greatly reduced cost compared to the dry winding; b. good air tightness of a product, because that a winding tension enables redundant resin solution to extrude out bubbles, and fills up gaps; c. a good arrangement parallelism of the fibers; d. reduced wearing of the fibers by the resin solution on the fibers in the wet winding; e. a high production efficiency; f. realization of the production of long-distance continuous pipe; and g. variable contents of the resin and fibers at any time according to product requirements.

Second Embodiment

Referring to FIG. 1 to FIG. 2, an embodiment of the present disclosure provides a non-metallic cabling continuous oil pipe, including an inner liner tube 100, a cable embedded layer 200 and a protection sleeve 300 connected in sequence from inside to outside.

In the above, the cable embedded layer includes cables and a plurality of reinforcement belts 210, a plurality of the reinforcement belts 210 are spirally wound onto an outer wall of the inner liner tube 100, and the cables are provided in the reinforcement belts 210 or among a plurality of the reinforcement belts 210.

In the present disclosure, the cables are embedded in the non-metallic cabling continuous oil pipe, instead of outlaying the cables in the conventional modes, which overcomes drawbacks of time-consuming and effort-consuming operation with a high cost, and easy damage to the cables due to separate armoring of outlaid independent cables required by a conventional steel-made oil pipe, reduces a wearing rate of the cables to a great extent, prolongs the service life of the cables, improves oil mining efficiency, and reduces an oil mining cost.

Third Embodiment

Referring to FIG. 1, an embodiment of the present disclosure provides a non-metallic cabling continuous oil pipe, including an inner liner tube 100, a circumferential reinforcement layer 400, a skeleton layer 500, a cable embedded layer 200 and a protection sleeve 300 flexibly connected in sequence from inside to outside. All cross sections of the inner liner tube 100, the circumferential reinforcement layer 400, the skeleton layer 500, the cable embedded layer 200 and the protection sleeve 300 are substantially in a ring shape, the "cross sections" above refer to planes perpendicularly to an axis direction of the continuous oil pipe.

In the above, the cable embedded layers 200 are provided by two, i.e. an inner layer and an outer layer respectively, the inner liner tube 100, the circumferential reinforcement layer 400, the skeleton layer 500, the inner layer, the outer layer and the protection sleeve 300 are flexibly connected in sequence from inside to outside. Specifically, the inner layer includes two signal cables 220 and a plurality of reinforcement belts 210, a plurality of the reinforcement belts 210 are spirally wound onto an outer wall of the inner liner tube 100 around an axis of the inner liner tube 100, the two signal cables 220 are respectively embedded inside two reinforcement belts 210, for providing a passageway for signal transmission of downhole equipment.

The outer layer includes two power cables 230 and a plurality of reinforcement belts 210, a plurality of the reinforcement belts 210 are spirally wound onto the outer wall of the inner liner tube 100 around the axis of the inner liner tube 100, and a spiral direction of the reinforcement belts 210 in the outer layer is opposite to a spiral direction of the reinforcement belts 210 in the inner layer. Two demising clearances are provided among a plurality of the reinforcement belts 210, wherein one demising clearance is formed by two adjacent reinforcement belts 210 thereof, and the other demising clearance is formed by other two adjacent reinforcement belts 210, and the two power cables 230 are respectively provided in the two demising clearances for transmitting power for electrical apparatus of an oil well. By providing the signal cables 220 and the power cables 230 with different functions in different cable embedded layers 200, the cables can be better protected while it facilitates the manufacturing.

Any two structures among the inner liner tube 100, the circumferential reinforcement layer 400, the skeleton layer 500, the cable embedded layer 200 and the protection sleeve 300 are flexibly connected therebetween, that is, they are not bonded with each other, and can move regarding to each other, thus curving of the oil pipe can be realized while ensuring the improvement on the strength of the oil pipe and reducing the stretch ratio, and the fact that the existing oil pipes only can be curved through elastic deformation is effectively remedied.

Finally, it is to be explained that all the above-mentioned embodiments are merely specific embodiments of the present disclosure for explaining the technical solutions of the present disclosure, rather than limiting the present disclosure, and the scope of protection of the present disclosure is not limited thereto. While the detailed description is made to the present disclosure with reference to the above-mentioned embodiments, a person ordinarily skilled in the art should understand that, within the technical scope disclosed in the present disclosure, any one skilled in the art still can modify the technical solutions disclosed in the preceding embodiments or can readily think of variations, or make equivalent substitutions to part of the technical features therein. These modifications, variations or substitutions do not make the corresponding technical solutions essentially depart from the spirit and scope of the technical solutions of the embodiments of the present disclosure, and all should be covered within the scope of protection of the present disclosure. Therefore, the scope of protection of the present disclosure should be determined by the scope of protection of the claims.

INDUSTRIAL APPLICABILITY

Overall Effects

For the non-metallic cabling continuous oil pipe provided in the present disclosure, the cables are directly embedded in the oil pipe, which overcomes drawbacks of time-consuming and effort-consuming operation with a high cost, and easy damage to the cables due to separate armoring of outlaid independent cables required by a conventional steel-made oil pipe, reduces a wearing rate of the cables to a great extent, prolongs the service life of the cables, improves oil mining efficiency, and reduces an oil mining cost.

The invention claimed is:

1. A non-metallic cabling continuous oil pipe, comprising: an inner liner tube, the inner liner tube being configured to form a passageway for medium transportation,
wherein from inside to outside, an outer wall of the inner liner tube is provided with at least one cable embedded layer and a protection sleeve in sequence, the at least one cable embedded layer including cables and a plurality of reinforcement belts, and the plurality of reinforcement belts being configured to resist a torsional deformation and bear an axial tension;
the protection sleeve is configured to prevent the cables from being worn; and
U-shape wear resistant belts provided outside the reinforcement belts,
wherein the U-shape wear resistant belts are configured to isolate adjacent reinforcement belts, and
wherein an outer wall of the inner liner tube is provided with spiral grooves cooperating with the U-shape wear resistant belts.

2. The non-metallic cabling continuous oil pipe of claim 1, wherein from inside to outside, the at least one cable embedded layer is a plurality of cable embedded layers.

3. The non-metallic cabling continuous oil pipe of claim 2, wherein a material of the reinforcement belts comprises fiber and resin.

4. The non-metallic cabling continuous oil pipe of claim 3, wherein in one of the at least one cable embedded layer, at least two reinforcement belts are spirally wound and arranged axially round the inner liner tube.

5. The non-metallic cabling continuous oil pipe of claim 3, wherein a number of the cable embedded layers is two, being an inner layer and an outer layer respectively, the inner layer is provided outside the inner liner tube, and the outer layer is provided outside the inner layer.

6. The non-metallic cabling continuous oil pipe of claim 5, wherein a cable in the inner layer is a signal cable, and the signal cable is embedded in the reinforcement belt in the inner layer; and
a cable in the outer layer is a power cable, a demising clearance is formed between at least two adjacent reinforcement belts in the outer layer, and the demising clearance is configured to accommodate the power cable, such that the power cable is spirally wound axially around the inner liner tube.

7. The non-metallic cabling continuous oil pipe of claim 6, wherein a horizontal cross section of the power cable is in has an oval shape, and a horizontal cross section of the signal cable is in has a circular shape.

8. The non-metallic cabling continuous oil pipe of claim 6, wherein spiral directions of the reinforcement belt in the inner layer and the reinforcement belt in the outer layer are opposite.

9. The non-metallic cabling continuous oil pipe of claim 6, wherein the power cable and the signal cable are staggered in a radial direction, for reducing interference between the power cable and the signal cable.

10. The non-metallic cabling continuous oil pipe of claim 2, wherein a circumferential reinforcement layer is provided between the inner liner tube and the cable embedded layer; and the circumferential reinforcement layer comprises a first fiber bundle and a second fiber bundle, and the first fiber bundle and the second fiber bundle are cross-wound and fixed on the inner liner tube in different spiral directions.

11. The non-metallic cabling continuous oil pipe of claim 10, wherein a skeleton layer is provided between the circumferential reinforcement layer and the cable embedded layer; and the skeleton layer comprises a plurality of fiber belts wound on the circumferential reinforcement layer.

12. The non-metallic cabling continuous oil pipe of claim 11, wherein the inner liner tube and the circumferential reinforcement layer, the circumferential reinforcement layer and the skeleton layer, the skeleton layer and the cable embedded layer, and the cable embedded layer and the protection sleeve are respectively arranged in such a way that one is slidably sleeved over the other, such that any adjacent two of the inner liner tube, the circumferential reinforcement layer, the skeleton layer, the cable embedded layer and the protection sleeve are not bonded to each other.

13. The non-metallic cabling continuous oil pipe of claim 11, wherein fibers in the reinforcement belts, the circumferential reinforcement layer and the skeleton layer are shaped in a manner of wet winding.

14. The non-metallic cabling continuous oil pipe of claim 1, wherein a demising clearance is formed between at least two adjacent reinforcement belts, and the demising clearance is configured to accommodate the cables, such that the cables are spirally wound axially around the inner liner tube.

15. The non-metallic cabling continuous oil pipe of claim 1, wherein the cables are embedded in the plurality of reinforcement belts.

16. The non-metallic cabling continuous oil pipe of claim 1, wherein a material of the protection sleeve comprises a high polymer material.

17. A non-metallic cabling continuous oil pipe, comprising an inner liner tube, a cable embedded layer and a protection sleeve connected in sequence from inside to outside, wherein the cable embedded layer comprises cables and a plurality of reinforcement belts, the plurality of the reinforcement belts are spirally wound onto an outer wall of the inner liner tube, and the cables are provided in the reinforcement belts or among the plurality of the reinforcement belts; and U-shape wear resistant belts provided outside the reinforcement belts, wherein the U-shape wear resistant belts are configured to isolate adjacent reinforcement belts, and wherein an outer wall of the inner liner tube is provided with spiral grooves cooperating with the U-shape wear resistant belts.

* * * * *